US010471527B2

(12) United States Patent
Stadtfeld et al.

(10) Patent No.: US 10,471,527 B2
(45) Date of Patent: Nov. 12, 2019

(54) SKIVING OF CYLINDRICAL GEARS

(71) Applicant: THE GLEASON WORKS, Rochester, NY (US)

(72) Inventors: Hermann J. Stadtfeld, Webster, NY (US); Robert T. Donnan, Macedon, NY (US)

(73) Assignee: THE GLEASON WORKS, Rochester, NY (US)

(*) Notice: Subject to any disclaimer, the term of this patent is extended or adjusted under 35 U.S.C. 154(b) by 0 days.

(21) Appl. No.: 15/933,580

(22) Filed: Mar. 23, 2018

(65) Prior Publication Data
US 2018/0207736 A1 Jul. 26, 2018

Related U.S. Application Data

(62) Division of application No. 14/781,753, filed as application No. PCT/US2014/034813 on Apr. 21, 2014, now Pat. No. 9,956,627.
(Continued)

(51) Int. Cl.
B23F 5/16 (2006.01)
B23F 21/04 (2006.01)
B23C 5/02 (2006.01)

(52) U.S. Cl.
CPC ............ B23F 5/163 (2013.01); B23F 21/04 (2013.01); B23F 21/046 (2013.01); B23C 5/02 (2013.01); Y10T 409/103816 (2015.01)

(58) Field of Classification Search
CPC .......... B23C 5/02; B23F 21/04; B23F 21/046; B23F 5/163; Y10T 409/103816; Y10T 409/104134; Y10T 409/104611
See application file for complete search history.

(56) References Cited

U.S. PATENT DOCUMENTS 4,575,285 A 3/1986 Blakesley
5,890,846 A 4/1999 Clark et al.
(Continued)

FOREIGN PATENT DOCUMENTS

CA 2812861 A1 4/2012
FR 947074 A 6/1949

OTHER PUBLICATIONS

Gleason Cutting Tools Corporation Catalog, "Pentac Cutter System", Jan. 2001, pp. 1-4.
(Continued)

Primary Examiner — Nicole N Ramos
(74) Attorney, Agent, or Firm — Robert L. McDowell

(57) ABSTRACT

A skiving tool comprising a cutter head (2) having a plurality of cutter blade mounting and positioning slots (8) arranged spaced, preferably equidistant, about the periphery (7) of the cutter head with the blade slots, and hence the cutting blades (4), preferably oriented perpendicular to the axis of rotation (A) of the cutter head. Alternatively, the blade slots may be inclined from the perpendicular orientation by less than 50 degrees, preferably less than 20 degrees, thereby forming a conical shaped cutter. Additionally, the blade slots may be positioned to extend radially from the cutter head axis whereby the longitudinal axis of a cutter blade will intersect the cutter head axis, or the blade slots may be radially offset from the cutter head axis. The blade slots may have any cross-sectional shape such as square, rectangular or those types having generally V-shaped seating surfaces (10) comprising a pair of angled mounting surfaces (12, 14) each less than 90 degrees. In contrast to known cutting blade configurations, the cutting blade (4) of the present invention has its cutting face (16) formed in a surface of the cutting blade that is located opposite to the seating surface or V-shaped seating surfaces (13, 15) of the cutting blade.

5 Claims, 11 Drawing Sheets

Related U.S. Application Data

(60) Provisional application No. 61/814,529, filed on Apr. 22, 2013.

(56) References Cited

U.S. PATENT DOCUMENTS

| | | |
|---|---|---|
| 6,120,217 A | 9/2000 | Stadtfeld et al. |
| 6,394,718 B1 | 5/2002 | Doerfel |
| 6,609,858 B1 | 8/2003 | Francis et al. |
| 2001/0024599 A1 | 9/2001 | Russell |
| 2007/0140798 A1 | 6/2007 | Cole et al. |
| 2012/0282055 A1 | 11/2012 | Marx et al. |
| 2013/0071197 A1 | 3/2013 | Marx et al. |
| 2016/0175950 A1 | 6/2016 | Stadtfeld et al. |

OTHER PUBLICATIONS

"Reliable and Efficient Skiving", Klingelnberg, Gear Technology, Sep. 2011, pp. 11-13.
International Search Report and Written Opinion for PCT/US2014/034813, ISA/EPO, dated Dec. 18, 2014, 13 pages.

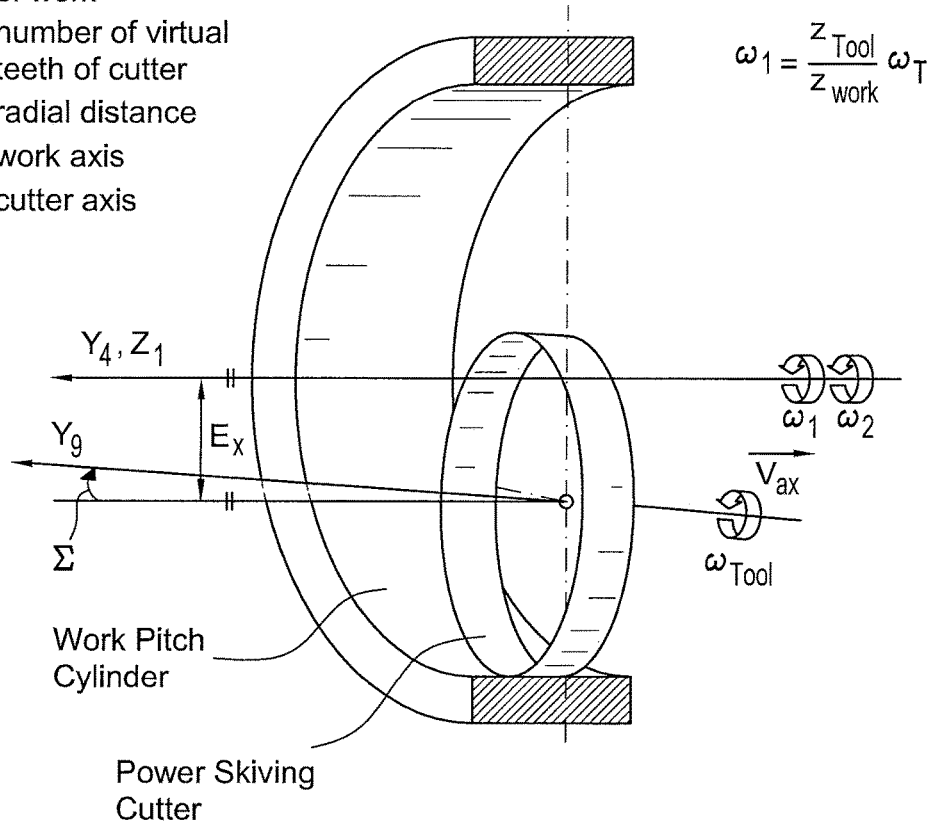

$\omega_1$ ...base angular velocity of work
$\omega_2$ ...incremental angular velocity due to helix angle
$\omega_{Tool}$ ...angular velocity of tool
$\Sigma$ ...shaft angle, work-tool
$V_{ax}$ ...feed motion
$V_{tan}$ ...incremental tangential motion
$D_{02}$ ...work pitch diameter
$z_{Work}$ ...number of teeth of work
$z_{Tool}$ ...number of virtual teeth of cutter
$E_X$ ...radial distance
$Z_1$ ...work axis
$Y_9$ ...cutter axis $$\omega_2 = \frac{V_{ax} \cdot \tan\beta}{D_{02}/2}$$

$$\omega_1 = \frac{z_{Tool}}{z_{work}} \omega_{Tool}$$

Work Pitch Cylinder

Power Skiving Cutter

$Z_{pos} = Z_1 + Z_2 = (CRT + P_z) \cos B + P_x \sin B$ $X_{pos}$ = Arbor Height + Gear Width + $(CRT + P_z) \sin B$ $Y_{pos}$ = Gear Pitch Radius - Cutter Pitch Radius

| Module | $D_{02}$ | $Z_2$ | | | $D_{02}^*$ | $D_{02}^*$ Selected | Fraction Generating Gear | | | | | Fraction Gear | | Cutter Slots |
|---|---|---|---|---|---|---|---|---|---|---|---|---|---|---|
| | | Calculated | Rounded | Selected | | | Calculated | | | | Selected | | | |
| | | | | | | | | Divisors | | | | | | |
| 2 | 223.7433 | 105.1250 | 106 / 105 | 105 | 225.6057 / 223.4773 | 223.4773 | 105 / 21 | 5 | 5 | 0 | 5 | 1 / 21 | 5 / 105 | 21 |
| 2.5 | 222.6791 | 83.7000 | 84 / 83 | 84 | 223.4773 / 220.8169 | 223.4773 | 84 / 21 | 0 | 4 | 2 | 4 | 1 / 21 | 4 / 84 | 21 |
| 3 | 221.6149 | 69.4166 | 70 / 69 | 69 | 223.4773 / 220.2848 | 220.2848 | 69 / 23 | 0 | 0 | 0 | 3 | 1 / 23 | 3 / 69 | 23 |
| 3.5 | 220.5508 | 59.2143 | 60 / 59 | 57 | 223.4773 / 219.7527 | 212.3035 | 57 / 19 | 0 | 0 | 3 | 3 | 1 / 19 | 3 / 57 | 19 |
| 4 | 219.4866 | 51.5625 | 52 / 51 | 51 | 221.3490 / 217.0923 | 217.0923 | 51 / 17 | 0 | 0 | 3 | 3 | 1 / 17 | 3 / 51 | 17 |
| 4.5 | 218.4224 | 45.6111 | 46 / 45 | 46 | 220.2848 / 215.4960 | 220.2848 | 46 / 23 | 0 | 0 | 0 | 2 | 1 / 23 | 2 / 46 | 23 |
| 5 | 217.3582 | 40.8500 | 41 / 40 | 42 | 218.1564 / 212.8356 | 223.4773 | 42 / 21 | 0 | 0 | 2 | 2 | 1 / 21 | 2 / 42 | 21 |
| 5.5 | 216.2940 | 36.9545 | 37 / 36 | 38 | 216.5602 / 210.7072 | 222.4132 | 38 / 19 | 0 | 0 | 2 | 2 | 1 / 19 | 2 / 38 | 19 |
| 6 | 215.2299 | 33.7083 | 34 / 33 | 34 | 217.0923 / 210.7072 | 217.0923 | 34 / 17 | 0 | 0 | 2 | 2 | 1 / 17 | 2 / 34 | 17 |
| 6.5 | 214.1657 | 30.9615 | 31 / 30 | 30 | 214.4318 / 207.5147 | 207.5147 | 30 / 15 | 5 | 0 | 3 | 2 | 1 / 15 | 2 / 30 | 15 |
| 7 | 213.1015 | 28.6071 | 29 / 28 | 30 | 216.0281 / 208.5788 | 223.4773 | 30 / 15 | 5 | 0 | 3 | 2 | 1 / 15 | 2 / 30 | 15 |

FIG. 9

SKIVING OF CYLINDRICAL GEARS

FIELD OF THE INVENTION

The invention is directed to cutting of cylindrical gears and in particular to cutting such gears by skiving.

BACKGROUND OF THE INVENTION

Skiving of cylindrical gears (also known as "hob peeling") is a cutting process that has existed for many years, primarily for manufacturing internal ring gears (e.g. see DE 243514). Like honing, skiving uses the relative sliding motion between two "cylindrical gears" whose axes are inclined. A skiving cutter usually looks like a shaping cutter with a helix angle, for example 20°, different than the helix angle of the cylindrical gear to be machined (e.g. US 2011/0268523). Other skiving tools comprise bar- or stick-shaped cutting blades arranged in a cutter head according to a hyperboloid as shown in, for example, US 2012/0282055.

Due to the continuous chip removal in skiving, the process is multiple times faster than shaping and more flexible than broaching, but it presents a challenge to machines and tools. While the roll motion between the cutting edges and the gear tooth slots occurs with the machine spindle RPM, the relative axial cutting motion is generally only about one third of the circumferential speed of the cutter. The cutting components of rolling and cutting which result in a "spiral peeling" are represented by the process designation skiving.

Because of the relatively low dynamic stiffness in the gear trains of mechanical machines as well as the fast wear of uncoated cutters, skiving of cylindrical gears failed to achieve a breakthrough against shaping or hobbing until recently. The latest machine tools with direct drive train and stiff electronic gear boxes present an optimal basis for the skiving process. Complex tool geometry and the latest coating technology have contributed to give the soft skiving of cylindrical gears a recent breakthrough.

SUMMARY OF THE INVENTION

The invention is directed to a skiving tool comprising a cutter head having a plurality of cutter blade mounting and positioning slots (blade slots) arranged spaced, preferably equidistant, about the periphery of the cutter head with the blade slots, and hence the cutting blades, preferably oriented perpendicular to the axis of rotation of the cutter head. Alternatively, the blade slots may be inclined from the perpendicular orientation by less than 50 degrees, preferably less than 20 degrees, thereby forming a conical shaped cutter. Additionally, the blade slots may be positioned to extend radially from the cutter head axis whereby the longitudinal axis of a cutter blade will intersect the cutter head axis, or the blade slots may be radially offset from the cutter head axis. The blade slots may have any cross-sectional shape such as square, rectangular or those types having generally V-shaped seating surfaces comprising a pair of angled mounting surfaces each less than 90 degrees. In contrast to known cutting blade configurations, the cutting blade of the present invention has its cutting face formed in a surface of the cutting blade that is located opposite to the seating surface or V-shaped seating surfaces of the cutting blade.

BRIEF DESCRIPTION OF THE DRAWINGS

FIG. 2 shows pitch cylinders of workpiece and tool.

FIG. 9 is a Table for determining cutter diameter and number of cutting blades.

DETAILED DESCRIPTION OF THE PREFERRED EMBODIMENT

Figure 1:
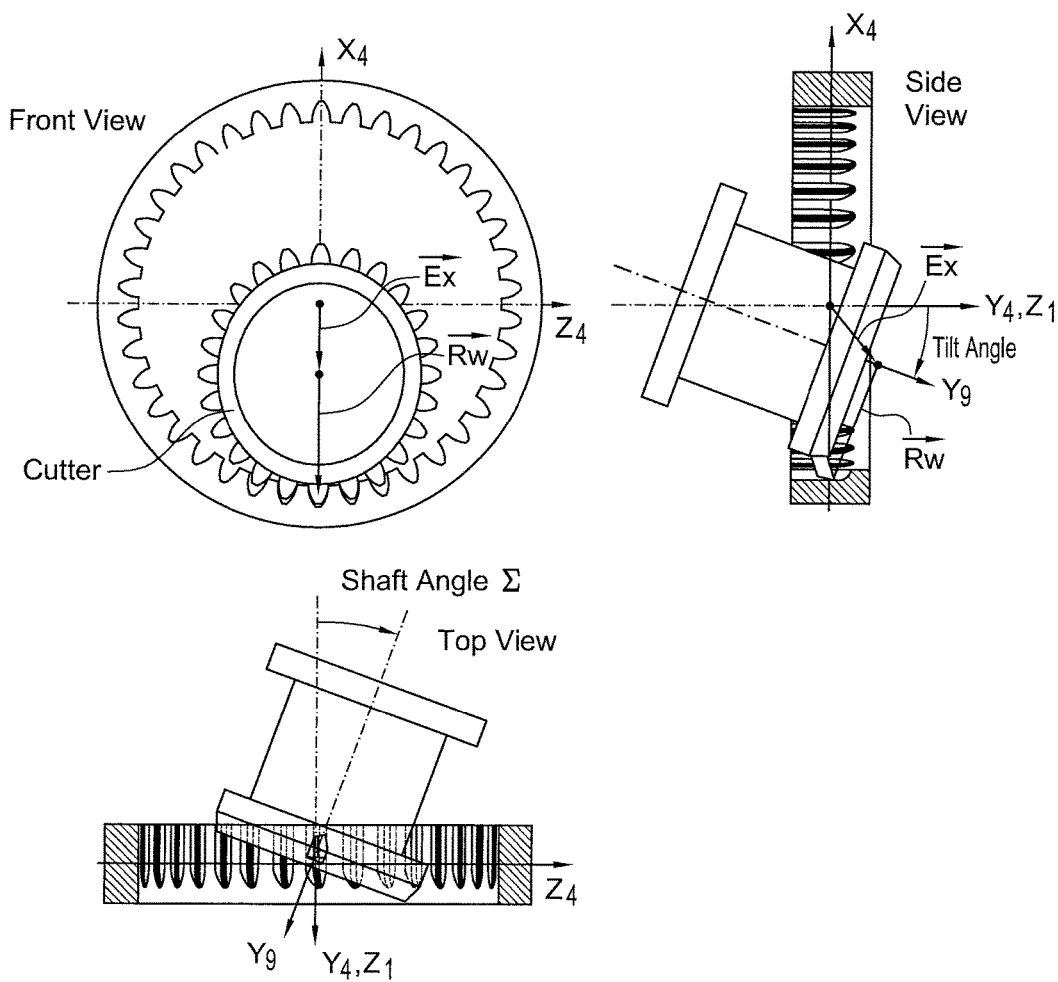
FIG. 1 illustrates the basic geometry and kinematic of skiving.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless otherwise specified.

The geometric setup of a skiving cutter relative to an internal ring gear is shown in FIG. 1. The front view onto the generating gear system is shown in the upper left graphic. The ring gear is oriented in the main coordinate system with its axis of rotation collinear to the Y-axis. The cutter center (origin of Rw) is positioned out of the center of $Y_4$ in the $X_4$-$Z_4$ plane by a radial distance vector Ex. The pitch circles of the cutter and the ring gear contact tangentially at the lowest point of the pitch circle. The top view which shows the tool inclination angle or shaft angle $\Sigma$ is drawn below the front view. In case of a spur gear the stroke motion is directed in line with the Y-axis. The relative velocity required as cutting motion is generated with a shaft angle $\Sigma$ around the $X_4$-axis of the coordinate system shown in FIG. 1. In case of a helical gear, the cutter inclination can be chosen independently from the helix angle. However, a helix angle of 20° or larger offers the possibility to match it with the shaft angle $\Sigma$ and use a simplified spur gear style shaper cutter for the skiving operation. Also in this case, the stroke motion is oriented in Y direction but an incremental rotation $\omega_2$ which depends on the stroke feed has to be added to $\omega_1$. The shaft angle $\Sigma$ can also be defined differently than the helix angle which still will require the same incremental $\omega_2$, but the tool front face orientation and side relief angles have to be calculated from the difference between helix angle and the shaft angle $\Sigma$. The side view to the right in FIG. 1 shows a second possible tool inclination which is called the tilt angle. This tool tilt angle can be used to increase the effective relief angles between the blades and the slots and it can also be utilized to eliminate interferences between the back side of a long spur gear style shaper cutter with minimum relief angles. Within limits, it is also possible to utilize the tilt angle for pressure angle corrections.

Figure 3:
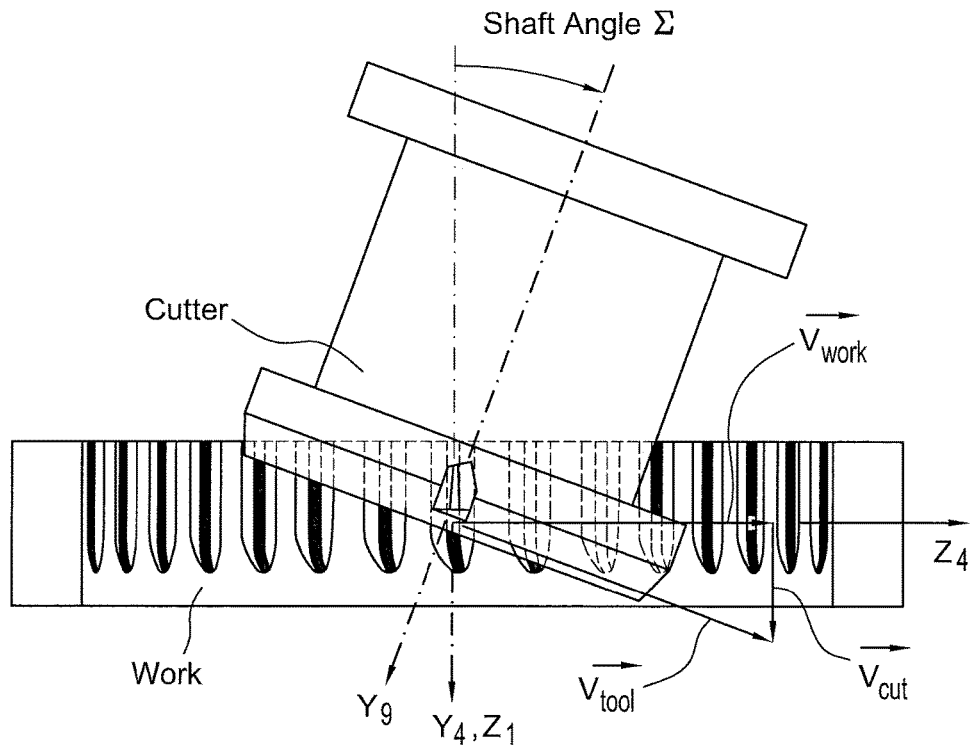
FIG. 3 illustrates calculation of cutting velocity.

The three dimensional side view in FIG. 2 shows an internal helical gear with a shaft angle $\Sigma$ between work and tool. FIG. 2 shows the base angular velocities of the work $\omega_1$ and the formula for its calculation. FIG. 2 also includes the incremental angular velocity $\omega_2$ and the formula to calculate it from the helix angle and the axial feed motion (stroke motion). The cutting velocity is calculated as the difference vector between the circumferential velocity vectors of work and tool in the cutting zone. FIG. 3 shows a top view of the configuration between tool and work with the velocity vectors.

Figure 4:
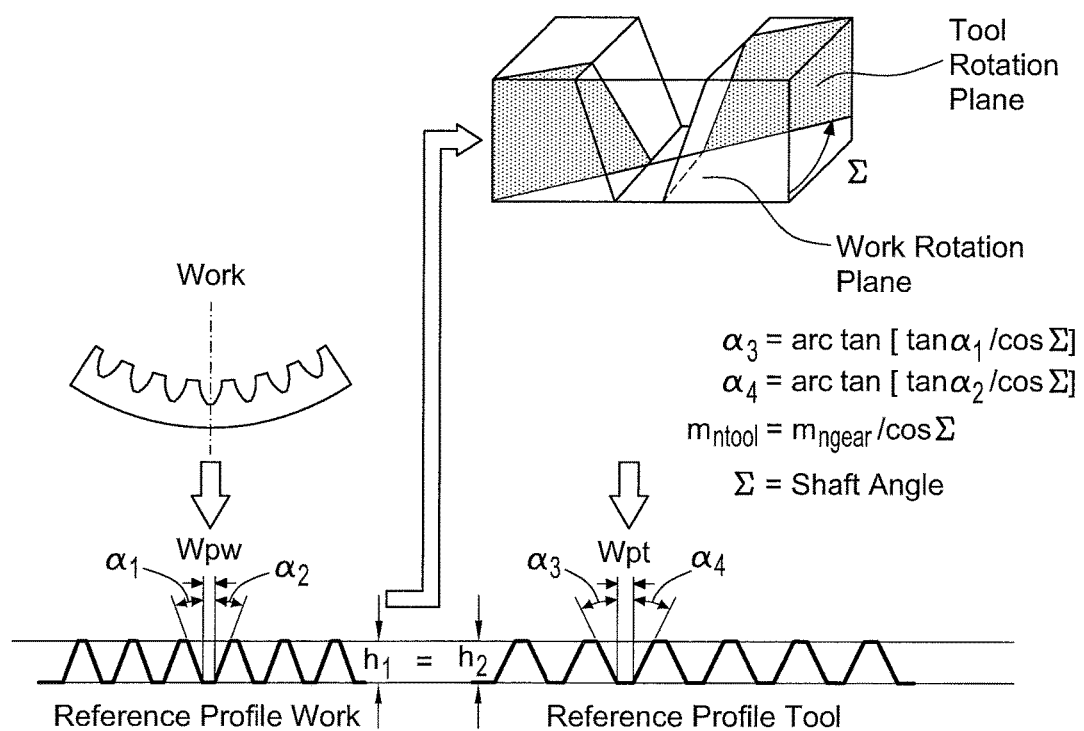
FIG. 4 depicts a procedure for the calculation of the tool reference profile.

The reference profile of the tool is determined from the reference profile of the work applying the procedure shown in FIG. 4. The reference profile of the work with its pressure angles $\alpha_1$ and $\alpha_2$ and its point width Wp is drawn as a trapezoidal channel which is cut with a plane under the shaft angle $\Sigma$ (FIG. 4, top, right side). The profile which is defined by the intersecting lines between plane and channel represents the reference profile of the tool. This tool reference profile is used in order to generate the involute in the tool cutting front (FIG. 4, bottom right side).

Figure 5:
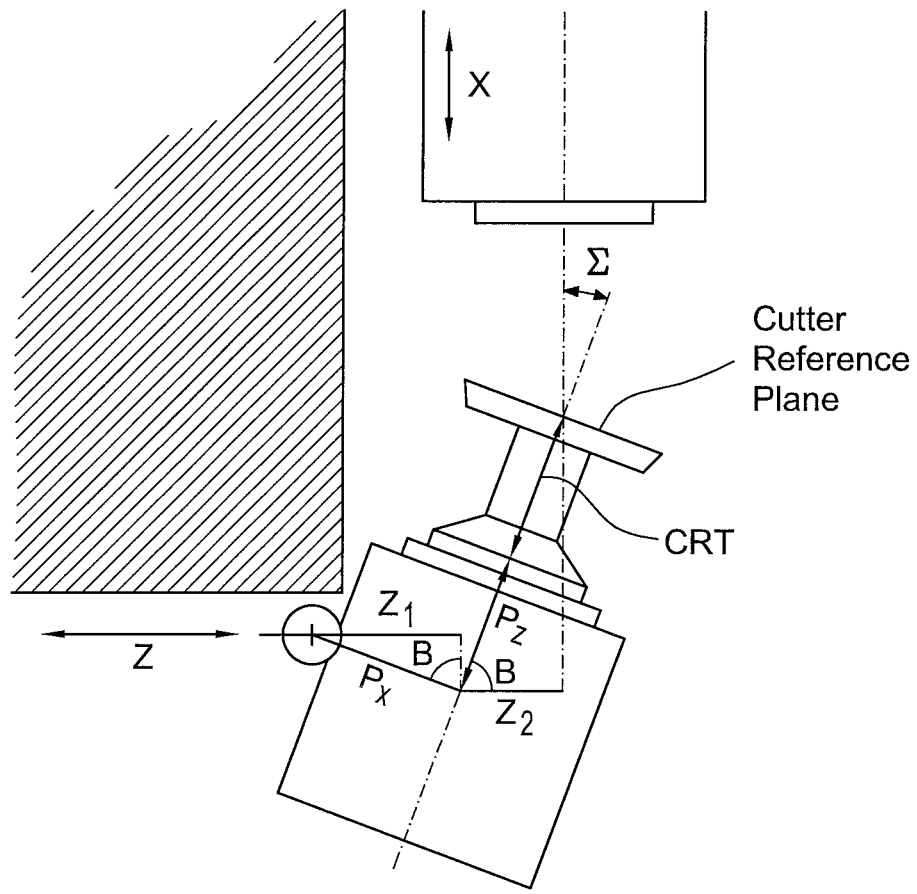
FIG. 5 illustrates calculation of machine settings.

The machine setting calculation is shown in FIG. 5 on the example of a bevel gear cutting machine, for example, a machine such as disclosed in U.S. Pat. No. 6,712,566. The explanation of the formula symbols are:

X-Y-Z . . . Machine axis directions (Y is perpendicular to the drawing plane)

$\Sigma$ . . . Shaft angle between cutter and work

CRT . . . Cutter reference height

B . . . Cutter swing angle $P_Z$ . . . Pivot distance to spindle front in Z-direction if B=0°

$P_X$ . . . Pivot distance to spindle center line in X-direction if B=0°

$Z_1$, $Z_2$ . . . Components in Z-direction

Depending on the helix directions in work and cutter, the cutting takes place below or above the work gear center line in order to keep the B-axis angle below 90°. In case of no corrections, the crossing point between the cutter axis and the work axis lies in the cutter reference plane.

Figure 6:
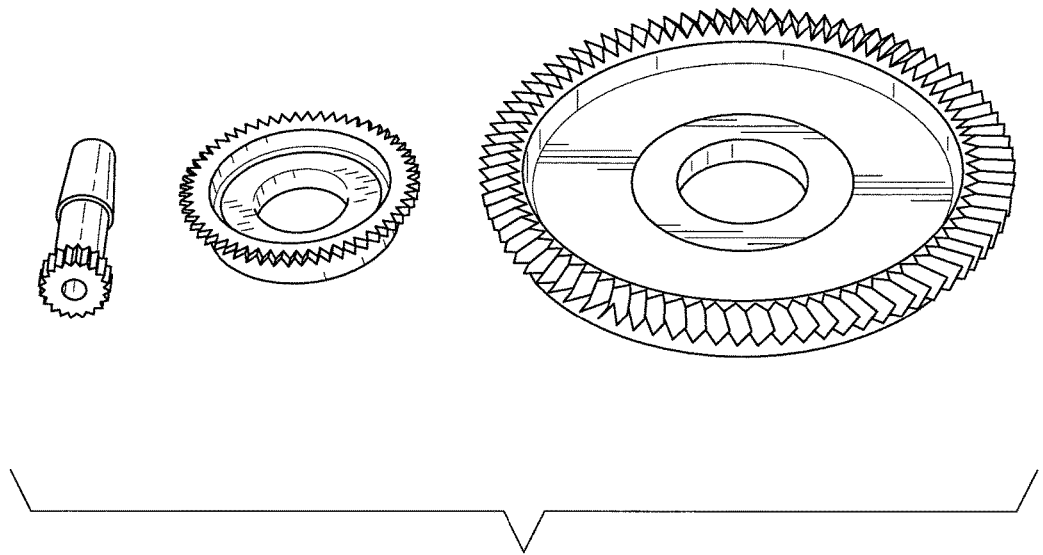
FIG. 6 shows coated solid high speed steel skiving cutters.

Traditionally, as mentioned above, skiving is performed with typical gear shaper cutters. A variety of different tools used for skiving is shown in FIG. 6. The first cutter (left) is a shaft type which is slightly tapered without helix angle in the cutting teeth. This cutter can be used for gears with a helix angle. The shaft angle between cutter and work will be set to the helix angle of the work. This also means that the helix angle of the work should be above 10° in order to generate sufficient cutting speed. Due to the straight nature of the cutting teeth, work pieces with small diameter and large face width might cause interferences between the slot and the far end of the cutting blade. The skiving cutter in the center of FIG. 6 is a wafer-type cutter (preferably with TiN coating) which can be re-sharpened a few times. The cutting teeth are also straight, which makes this cutter also only suitable for work pieces with a helix angle. The wafer cutter has very short relieved teeth, which will prevent interference problems in case of helical slots that wind around a small diameter work piece. The skiving cutter to the right of FIG. 6 has serrated blade front faces and teeth which are oriented under a helix angle. Preferably, the skiving cutter of FIG. 6, right, is coated with a TiAlN coating.

Figure 7:
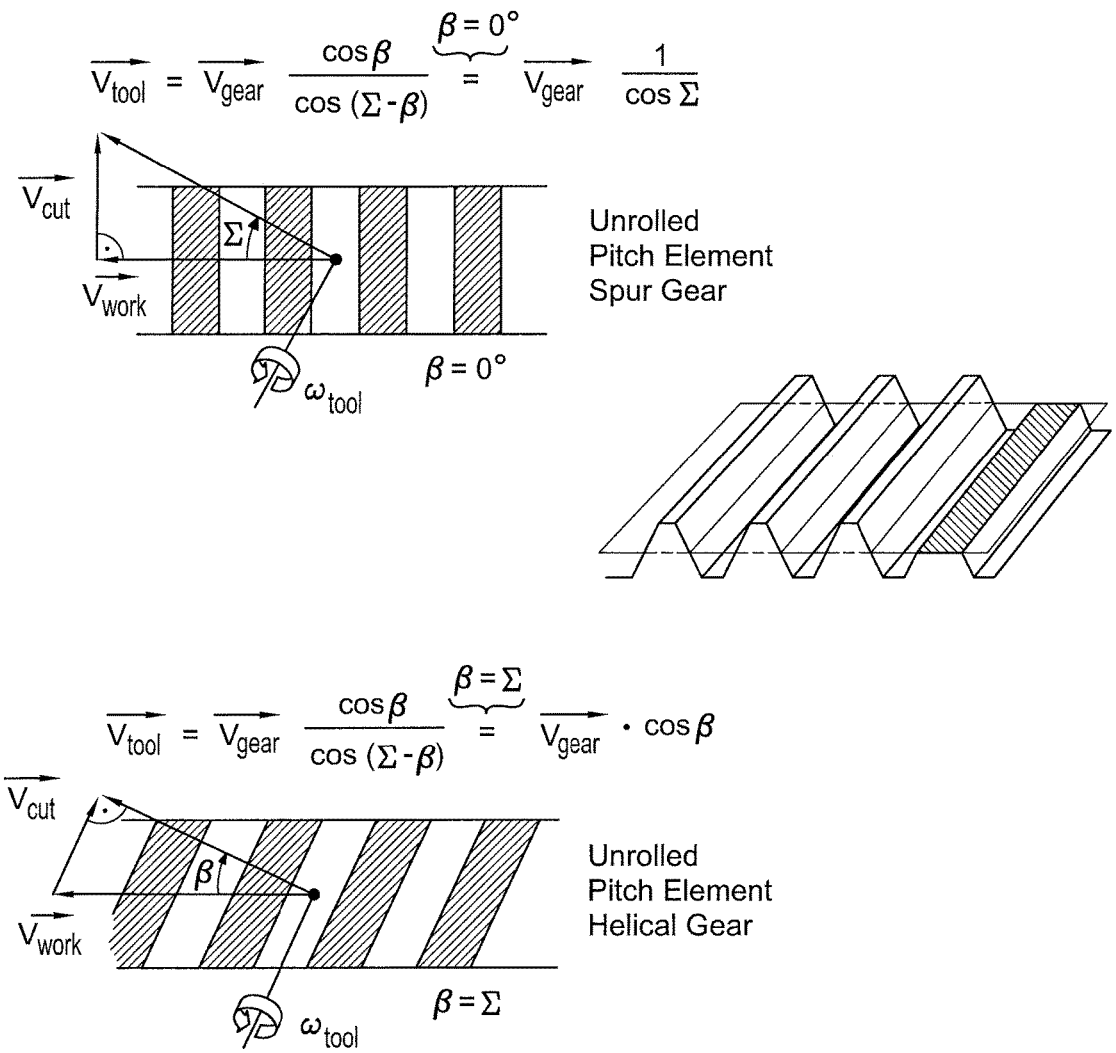
FIG. 7 illustrates cutting velocity calculation.

If the helix angle of the work piece is 15° and the tool helix angle is 20°, then the shaft angle between skiving cutter and work has to be setup to 5° (same helix direction). If the helix directions are opposite then a shaft angle of 35° has to be used. An interesting case occurs if the gear helix angle of the work is identical to the cutter helix angle (same amount and same hand). In this case the shaft angle between cutter and work is zero and no skiving motion is generated. The calculation of the cutting surface speed depending on the helix angle $\beta$ of the work and the shaft angle $\Sigma$ is shown in FIG. 7. The upper graphic represents the unrolled pitch cylinder with teeth and slots indicated (see also right side graphic in FIG. 7) for a spur gear. With $\beta=0$ the formula is simplified to the first special case. The lower graphic shows the formula simplification for the second special case, which occurs if the helix angle $\beta$ is equal the shaft angle $\Sigma$. The cutting velocity formula considers next to the circumferential velocity at the work gear pitch diameter the helix angle $\beta$ of the work and the shaft angle $\Sigma$ between work and skiving cutter. The cutting velocity vector is automatically directed in the flank lead direction if the formula in FIG. 7 is applied. Although the formula indicates some interplay between $\Sigma$ and $\beta$, the major parameter for generation of sufficient cutting velocity is the shaft angle $\Sigma$ between the work and tool axes.

Figure 8A:
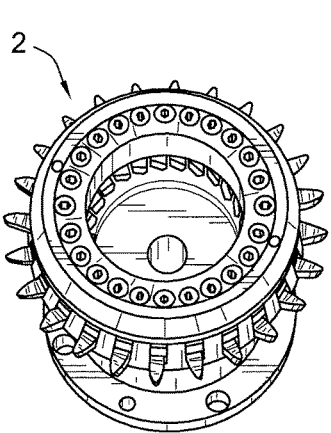
FIGS. 8(a)-8(d) show a stick blade skiving cutter with carbide cutting blades.
Figure 8B:
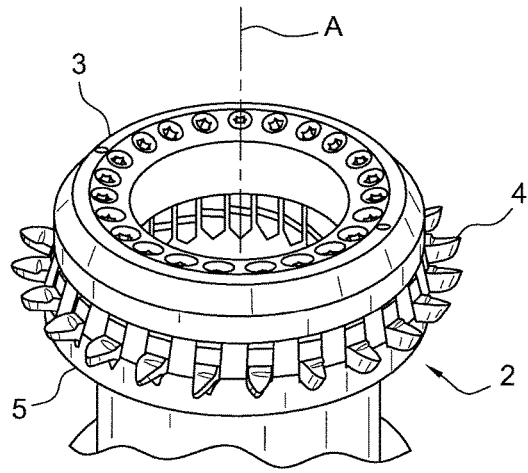
Figure 8C:
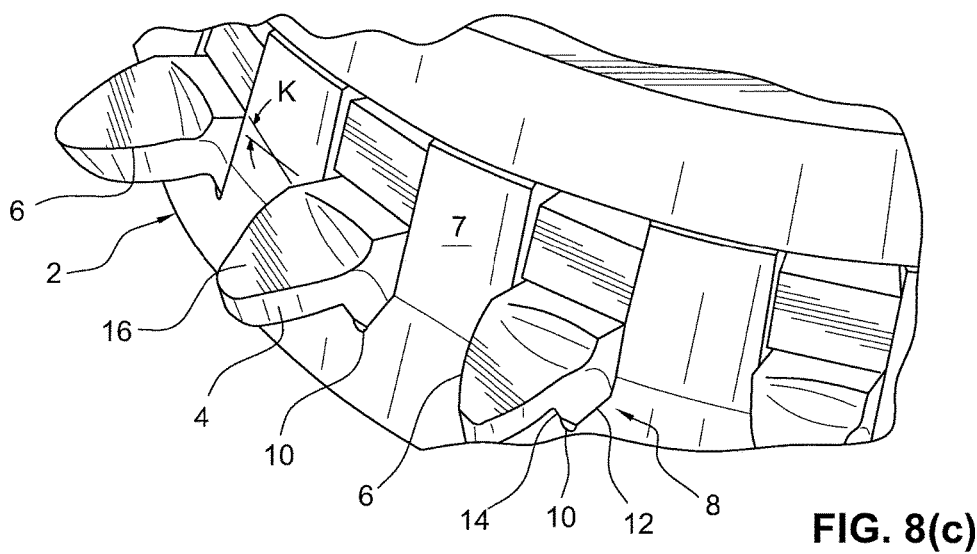

A cutter head 2 which uses stick blades 4 has been developed especially for skiving (see FIG. 8a-8c). The blade material is preferably carbide and the blade profiles are 3-face ground and all-around coated preferably with TiAlN (titanium aluminum nitride) coating although other coatings are not excluded. The blade profile 6 resembles an involute which is derived from the tool reference profile in FIG. 4. The blades can either be ground as full profile blades just like the profiles of the cutters shown in FIG. 6, or as alternating left flank-right flank blades which allows it to realize sufficient side rake angles. The alternate blade arrangement offers very good tool life and an exceptionally smooth cutting operation. However, the productivity is slightly lower than the one using full profile blades.

The preferred cutter of the present invention is illustrated in FIG. 8c and comprises a cutter head 2 having a front face 3 and a back face 5 with a plurality of cutter blade mounting and positioning slots (blade slots) 8 arranged spaced, preferably equidistant, about the periphery 7 of the cutter head. The blade slots 8, and hence the cutting blades 4, are preferably oriented perpendicular to the axis of rotation, A, of the cutter head but may be inclined from the perpendicular by less than 50 degrees, preferably less than 20 degrees, thereby forming a conical shaped cutter. Additionally, the blade slots may be positioned to extend radially from the cutter head axis whereby the longitudinal axis of a cutter blade will intersect the cutter head axis A (FIG. 10), or the blade slots may be radially offset from the cutter head axis. The blade slots may have any cross-sectional shape such as square, rectangular or those types having generally V-shaped seating surfaces 10 comprising a pair of angled mounting surfaces 12, 14 each less than 90 degrees (e.g. see U.S. Pat. No. 5,890,946).

Figure 8D:
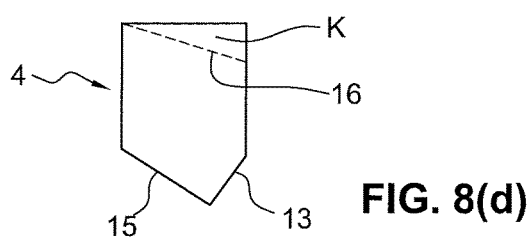

However, in contrast to the known cutting blade configuration, the cutting blade of the present invention has its cutting face 16 formed in a surface of the cutting blade 4 that is located opposite of the seating surfaces 13, 15 of the cutting blade (see blade cross-sectional view FIG. 8d) and, hence, also opposite of the V-shaped seating surfaces 12, 14 of cutter head 2 when the cutting blade 4 is mounted in the cutter head. The V-shaped seating surfaces 12, 14 open-up in a direction toward the front face 3 and the cutting faces 16 of the cutting blades 4 are oriented generally toward the front face 3. With this arrangement, forces encountered during cutting are transmitted to the V-shaped seating surfaces 12, 14 thereby fortifying the seating of the cutting blades 4 in the cutter head 2 resulting in a cutting tool of enhanced stability during the cutting process. In FIG. 8d, any side rake and relief angles have been omitted for simplicity of viewing and angle K (see FIG. 8c also) is the cutting face angle of blade 4 which is generally equal to the shaft angle $\Sigma$.

Due to the design of the cutter head of FIGS. 8a-8c, the blades have spaces between them which are larger than the tooth thickness of the reference profile. The cutters may be configured for a certain module of gear, such that the blades in the cutter head represent every second, third or fourth slot of the reference profile. Regarding a low work piece runout and high spacing quality, it is preferable to avoid a common denominator between the theoretical number of skiving cutter teeth and the number of work gear teeth. The same rule applies of course for solid skiving cutters as well.

A procedure was developed which allows a minimum of different cutter head types for a variety of gears. For example, external gears without pitch diameter limitation or internal ring gears with a minimal pitch diameter of about 330 mm and above can be skived with a 9 inch (228.6 mm) diameter peripheral cutter head. The Table in FIG. 9 uses modules from 2 to 7 mm in 0.5 mm steps to indicate an initial tool pitch diameter, $D_{02}$. The effective tool module, $m_{tool}$, is calculated from the equation shown in FIG. 4 to account for the angular orientation (e.g. 20°) of the Tool Rotation Plane (i.e. shaft angle $\Sigma$) and from there the theoretical number of tool teeth $Z_2$ is determined by $D_{02}/m_{tool}$. The tool teeth number $Z_2$ must be rounded up or down (by one or more integer values) in order to arrive at an integer number of teeth (Selected $Z_2$) from which an effective pitch diameter of the tool, (Selected $Z_2$) X $m_{tool}=D_{02}^*$, is determined. The developed stick blade system allows adjustment of the blade stick in or out by some small amount to match the required pitch diameter for the number of teeth selected.

However, the preferred cutter heads within the 9 inch size family of cutters usually comprise blade slot numbers of 15, 17, 19, 21 or 23. In the next columns of the Table, all existing integer fractions between 2 and 5 are determined (the range may be expanded to 6, 7, 8 or more). The goal is to find the largest number of slots which is available in the 9 inch diameter line of cutters to assure the maximal productivity. In other words, the skiving cutter never represents the theoretical tool tooth number with the number of slots but only a fraction thereof. The theoretical number of tool teeth becomes the virtual tool tooth number of which only a fraction is represented on the cutter head. If a number is selected and typed in the spread sheet, next to the actual fraction of slot and theoretical tooth number the resulting number of cutter slots is shown in the last column. If this number does not match an existing cutter head, then a second or third number has to be chosen until a matching cutter is found. In some cases (e.g. Modules 3, 5, 5.5 and 7 of FIG. 9), the immediate up and/or down rounded integer may not provide an acceptable number of cutter slots and so the rounding up and down is continued until a suitable number of cutter slots can be attained. It is to be understood that while the foregoing example is based upon a 9 inch diameter cutter, other cutter head diameters, e.g. 4.5 inches (114.3 mm), 7 inches (177.8 mm) and 8 inches (203.2 mm), are also contemplated by the invention.

Figure 10:
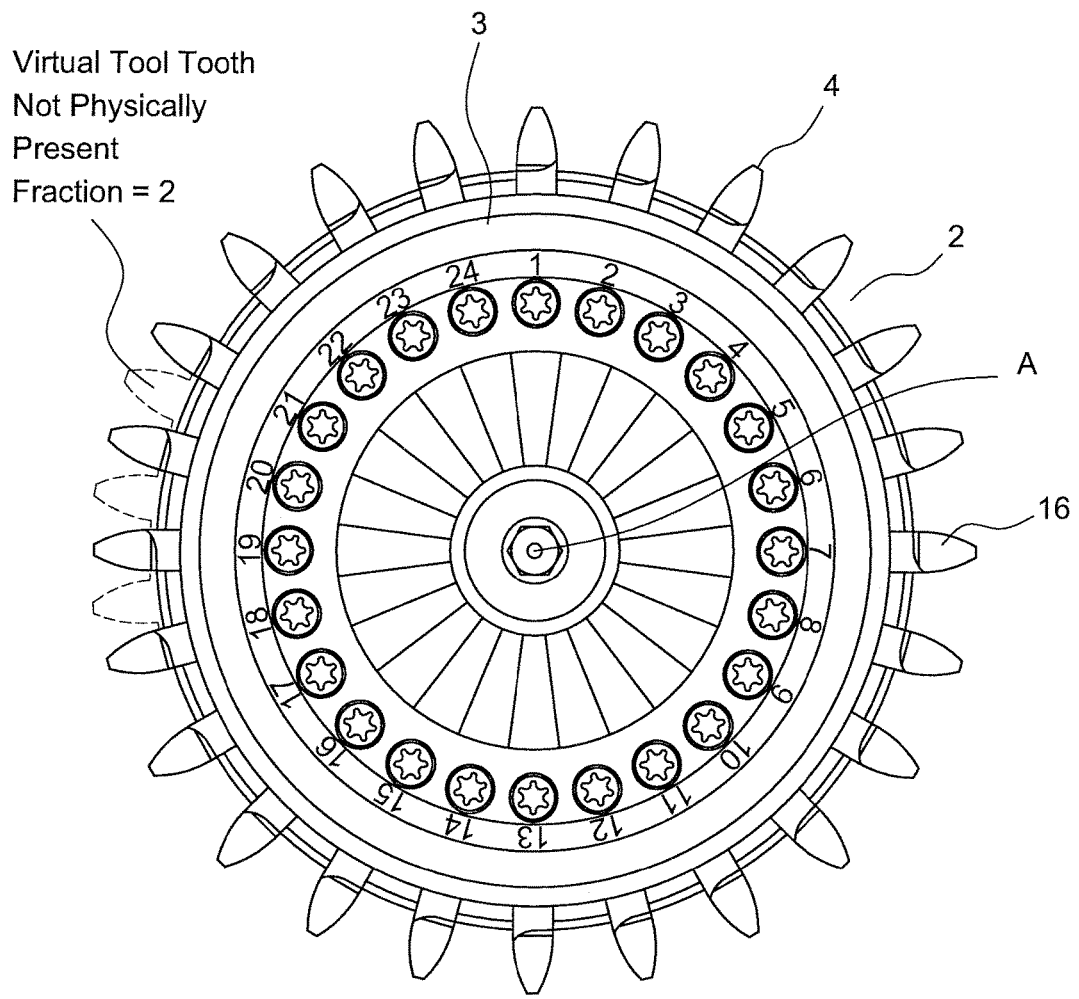
FIG. 10 illustrates virtual tool teeth on a skiving cutter.

Depending on the number of teeth of the work gear, the virtual number of tool teeth may be even and never is a prime number. This will not be of any disadvantage, as long as a hunting tooth relationship between work and virtual cutter is given. In such cases, also between work and real cutter, the hunting tooth principle exists. The peripheral stick blade cutter design will physically not allow the virtual number of blades to fit next to each other. The cutter of FIG. 10 represents each other tooth which is indicated with the dashed drawn (virtual) blades between the real blades.

Solid cutters made from high speed steel (HSS), such as M48, with a TiAlN coating are generally suitable for a surface speed of up to about 100 m/min in a wet skiving environment. Carbide stick blades (e.g. 10% Co-90% WC) with a TiAlN coating allow about 300 m/min surface speed which may be considered to be a "critical speed". However, with respect to tool wear, it should be considered that in skiving, very high tool rotational speeds are required in order to achieve the desired surface speed. This in turn creates a profile sliding which is superimposed on the cutting speed. The profile sliding has its highest value at the blade tip which also undergoes a long chip removing engagement path and thereby resulting in the blade tip being vulnerable to additional side relief wear.

Cutting trials have shown that in skiving it is possible to reduce the surface speed to between 150 and 200 m/min which is below the critical speed (i.e. Under-Critical Speed, UCS) while increasing the infeed and feed rate in order to keep the productivity high, yet receive a significant improvement in tool life.

As an example, a module 4.0 mm gear was cut by wet UCS skiving with TiAlN coated carbide blades and 172 m/min surface speed. A first roughing pass used an infeed setting of 5 mm and a feed rate of 0.045 mm per blade. The chips were large and only slightly curved. Each chip represents one flank and part of the tooth slot bottom. A second pass used an infeed setting of 3 mm and a feed rate of 0.28 mm per blade. This chip consisted of two flanks connected by a bottom portion. A finishing pass used an infeed of 1.00 mm and a feed rate of 0.015 mm per blade. This chip also had two flanks and a bottom chip portion connected to a form U-shaped appearance.

In another example, the same type of gear was cut utilizing TiAlN coated carbide blades and 172 m/min surface speed in a three-pass dry cutting process using the same infeed values and feed rates as applied in the wet cutting. Except for a color change due process heat, the dry chips generally have the same appearance as the chips from wet cutting.

The comparison between the wet and dry skiving processes with coated carbide stick blades shows the dry process as being advantageous. The process heat helps to plastically deform the chip during the shearing action. If the process parameters and tool geometry are chosen to move the process heat into the chips and then away from tool and work piece with the chips, a cool skiving process is the result. Dry skiving delivers a better surface finish and causes equal or even lesser tool wear than the "wet" process version. Additionally, the chip surface on the side adjacent to the sheared off side is smoother and machine power readings showed about 15% lower spindle power during dry skiving. The current skiving developments indicate that dry skiving delivers a better tool life, which is anticipated to be even more significant than in dry cutting of bevel gears.

Dry UCS skiving with coated carbide blades results in the optimal combination between low tool wear and low skiving times. An additional advantage is that machines with medium speed high-torque spindles (e.g. 1000 RPM maximum for machine size 600 mm Outside Diameter) can be applied without compromising the performance of the machine e.g. for bevel gears which require low RPM and high torque. This advantage is important if a manufacturer performs skiving on bevel gear cutting machines. The manufacturer expects appropriate machine performance for all bevel gear machining but also appreciates the ability to practice an efficient skiving process on the same machine.

Thermographic imaging of dry skiving in the above example taken during the roughing pass at mid face reveals the highest temperature of 107° F. (42° C.) occurs around the cutter and at the work gear sections which moves away from the cut. This is also the temperature that can be measured on part and cutter after the cycle. It can be concluded that dry UCS process has an optimal heat transfer into the chips and quickly reaches a rather low steady state temperature of cutter and work holding.

Figure 11:
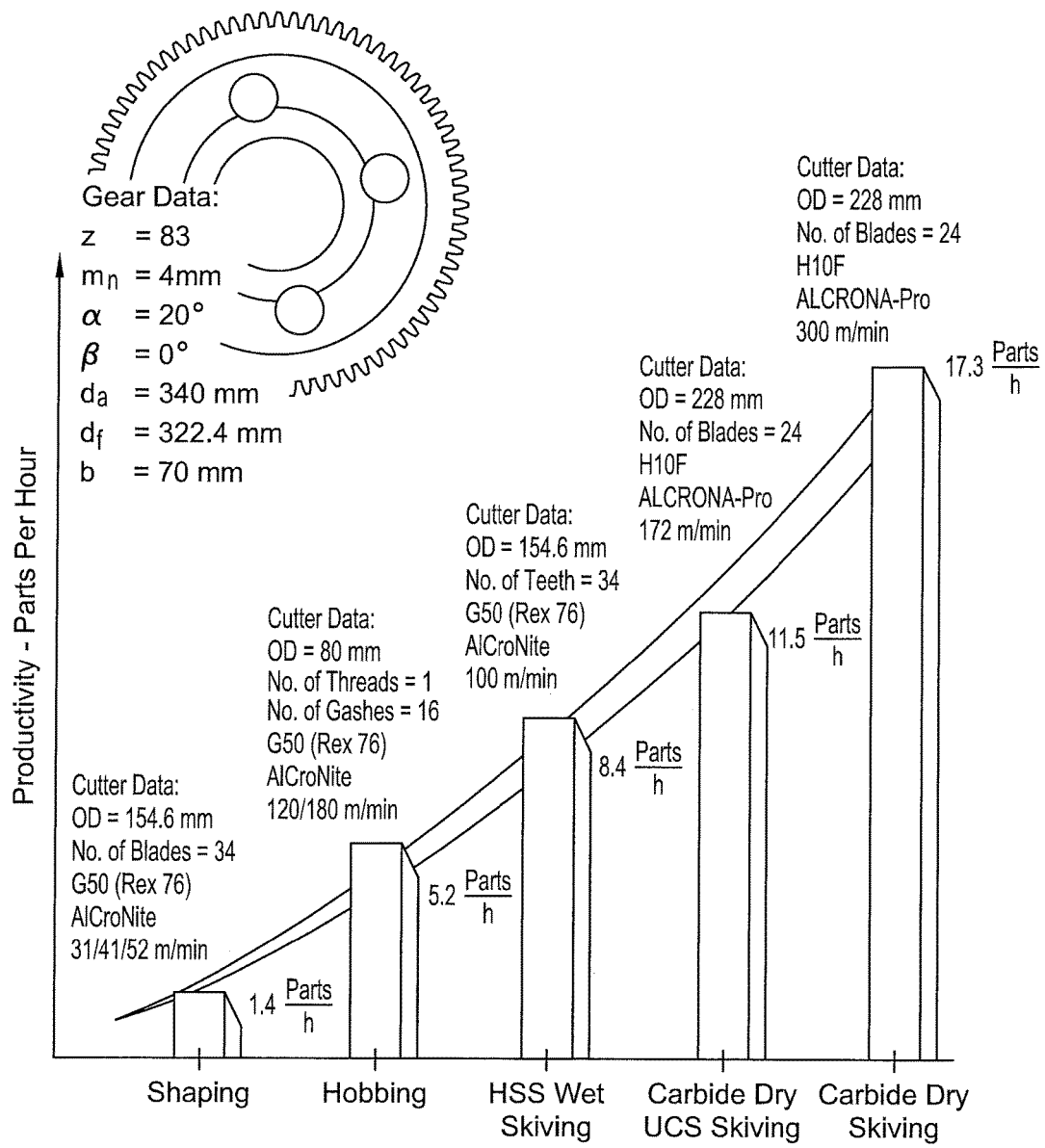
FIG. 11 is a comparison of productivity for shaping, hobbing and skiving.

A productivity comparison between the traditional processes hobbing and shaping and three variations of the skiving process is shown in FIG. 11. In order to establish the same basis for each process, an external ring gear with the gear data as those in the above examples was used for all processes. The objective was a finishing quality with scallop or generating flat amplitudes at or below 5 μm. The shaping process used a TiAlN coated shaper cutter from HSS material with 34 teeth and was setup as a 3-cut finishing cycle. The identical shaper cutter was used for the wet skiving where the cutting was done in four passes. For the hobbing process, a one-start hob with 16 gashes also from TiAlN coated HSS material was utilized in a 2-cut cycle. Dry skiving with TiAlN coated H10F carbide blades is represented in the diagram as UCS-skiving with 172 m/min and as high speed skiving with 300 m/min, both setup as a three pass cycle. The dry skiving bars are based on a 24 blade and 9" diameter cutter head. The chip thickness in the case of UCS-skiving is 10% to 20% higher than in the case of high speed skiving which reduces the productivity difference between the two process variations and yet gives the UCS-skiving a tool life advantage. FIG. 11 indicates that skiving has between 6 to 12 times the productivity of shaping and between 1.6 and 3.3 times the productivity of hobbing.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutting blade for skiving of gears, said cutting blade comprising:
   a bar-shape with a length extending in a longitudinal direction and comprising a cutting face located at one end of said length,
   said cutting blade further comprising a pair of angled mounting surfaces defining a generally V-shape extending along at least a portion of said length, said cutting face being arranged opposite to said pair of angled mounting surfaces whereby with respect to a longitudinal cross-section of said cutting blade, the angled mounting surfaces are spaced from and not in contact with the cutting face.

2. In a method of producing a toothed workpiece by skiving, the improvement comprising:
   providing a tool comprising a cutter head, said cutter head being rotatable about an axis of rotation and comprising a front face, a back face, and a peripheral surface located between said front face and said back face, said peripheral surface comprising a plurality of cutting blade mounting and positioning slots arranged therein and extending in a longitudinal direction inward toward said cutter head axis, wherein each of said mounting and position slots includes seating surfaces defining a generally V-shape which open-up in a direction toward said front face,
   providing a cutting blade located in at least one of said plurality of cutting blade mounting and positioning slots, said cutting blade being bar-shaped with a length extending in a longitudinal direction and comprising a cutting face located at one end of said length with said cutting face projecting outward from said peripheral surface and being oriented in a direction toward said front face, said cutting blade further comprising a pair of angled mounting surfaces defining a generally V-shape extending along at least a portion of said length, said cutting face being arranged opposite to said pair of angled mounting surfaces, said pair of angled mounting surfaces being positioned in and complementary with said V-shape seating surfaces of said cutter head,
   engaging said tool and said workpiece,
   machining teeth on said workpiece by skiving.

3. The method of claim 2 wherein said machining is carried out at a surface speed of 150-200 m/min.

4. The method of claim 2 wherein said cutting blade comprises carbide.

5. The method of claim 2 wherein said cutting blade is coated with TiAlN.

* * * * *